United States Patent
Joos et al.

(10) Patent No.: US 7,594,054 B2
(45) Date of Patent: Sep. 22, 2009

(54) DATA BUS INTERFACE FOR A CONTROL UNIT, AND CONTROL UNIT HAVING A DATA BUS INTERFACE

(75) Inventors: Eugen Joos, Zaberfeld (DE); Steffen Michelberger, Gundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/215,706

(22) Filed: Aug. 29, 2005

(65) Prior Publication Data
US 2006/0106966 A1   May 18, 2006

(30) Foreign Application Priority Data
Sep. 2, 2004   (DE) ................. 10 2004 042 380

(51) Int. Cl.
*G06F 13/14* (2006.01)
*G06F 11/00* (2006.01)

(52) U.S. Cl. ........................... 710/305; 714/11

(58) Field of Classification Search ............... 710/305; 714/11
See application file for complete search history.

(56) References Cited

U.S. PATENT DOCUMENTS

| | | | | | |
|---|---|---|---|---|---|
| 3,569,847 A | * | 3/1971 | Adams | ............. | 330/255 |
| 4,253,179 A | * | 2/1981 | Shimizu | ............. | 370/363 |
| 4,542,502 A | * | 9/1985 | Levinson et al. | ............. | 370/403 |
| 4,887,262 A | * | 12/1989 | van Veldhuizen | ............. | 370/449 |
| 4,942,571 A | * | 7/1990 | Moller et al. | ............. | 370/407 |
| 5,121,386 A | * | 6/1992 | Wolfsgruber et al. | ............. | 370/462 |
| 5,187,709 A | * | 2/1993 | Williamson et al. | ............. | 370/445 |
| 5,214,582 A | * | 5/1993 | Gray | ............. | 701/33 |
| 5,274,636 A | * | 12/1993 | Halter et al. | ............. | 370/212 |
| 5,321,689 A | * | 6/1994 | Suzuki et al. | ............. | 370/228 |
| 5,900,017 A | * | 5/1999 | Genduso et al. | ............. | 711/146 |
| 5,901,281 A | * | 5/1999 | Miyao et al. | ............. | 714/11 |
| 5,995,376 A | * | 11/1999 | Schultz et al. | ............. | 361/788 |
| 6,216,243 B1 | * | 4/2001 | Wittrodt | ............. | 714/734 |
| 6,915,584 B2 | * | 7/2005 | Skerka et al. | ............. | 33/316 |

FOREIGN PATENT DOCUMENTS

| | | |
|---|---|---|
| EP | 0972389 | 1/2000 |
| GB | 2345153 | 6/2000 |
| WO | WO 98/44399 | 10/1998 |

OTHER PUBLICATIONS

IEEE 100—The Authoritative Dictionary or IEEE Standards Terms—Seventh Edition; Copyright 2000; Definition of Tranceiver, p. 1198.*

* cited by examiner

*Primary Examiner*—Mark Rinehart
*Assistant Examiner*—Jeremy S Cerullo
(74) *Attorney, Agent, or Firm*—Kenyon & Kenyon LLP

(57) ABSTRACT

A data bus interface for a control unit, in particular for a motor vehicle control unit is described, as well as a control unit, in particular a motor vehicle control unit, having a data bus interface for accessing a data bus for communicating with another control unit via the data bus. A data bus interface may be used with a particularly high degree of flexibility and be manufactured economically. The data bus interface includes two arithmetic units, in particular two microprocessors, which communicate with each other via an internal data bus; and two transceivers which are connected either to the same external data bus or to two different external data buses and are interconnected with the two arithmetic units in such a way that the two arithmetic units are connected either to the same external data bus or to the two different data buses.

27 Claims, 2 Drawing Sheets

DATA BUS INTERFACE FOR A CONTROL UNIT, AND CONTROL UNIT HAVING A DATA BUS INTERFACE

BACKGROUND INFORMATION

The present invention relates to a data bus interface for a control unit, in particular for a motor vehicle control unit. The present invention also relates to a control unit, in particular a motor vehicle control unit, having a data bus interface for accessing a data bus for communicating with at least one other control unit via the data bus.

In this case, the interface is an interface between one or more microprocessors and a data bus. The interface conditions signals of a microprocessor which are to be transmitted to another microprocessor via a data bus according to a selected transmission protocol (e.g. CAN (Controller Area Network), TTCAN (Time-Triggered CAN), MOST (Media-Oriented Systems Transport), FlexRay, etc.) before they are injected into the data bus. The interface may be part of a control unit, in particular part of a motor vehicle control unit. In this case, control programs may be run on the microcontrollers for performing a normal control and/or regulation function, and they may be used to control and coordinate communication via the data buses. However, it is also possible to use the microcontrollers of the interface only to control and coordinate communication via the data buses and to obtain the data to be transmitted from other microcontrollers and to merely forward the data received. At least one control unit is connectable to a data bus via an interface. The control units connected to the same data bus may then exchange information with each other via the data bus.

Providing not only one, but also two or even more arithmetic units, in particular microprocessors in the form of microcontrollers in a CAN interface, is conventional. Generally, however, only those microprocessors which have only one CAN controller are combined in a CAN interface. However, microcontrollers having more than one, for example two, CAN controllers are also conventional. A CAN interface having multiple microcontrollers is therefore conventional. In addition, a CAN interface which has only one microcontroller, which, however, includes a plurality of CAN controllers, is conventional.

According to the related art, in a CAN interface having multiple microcontrollers internal communication between the individual controllers takes place via a dual-port RAM (random-access memory). However, these are very expensive and power-intensive. The automotive industry, in particular, contends with enormous cost pressure and does not have unlimited quantities of power available. The use of dual port RAMs for communicating between microprocessors in a multiprocessor system is therefore not a particularly suitable solution for motor vehicles.

SUMMARY

An object of the present invention is to design and improve a data bus interface of the type mentioned above so that it may be used with a particularly high degree of flexibility and be manufactured economically.

In accordance with an example embodiment, on the basis of the data bus interface of the type mentioned above, the interface includes:
two arithmetic units, in particular two microprocessors, which communicate with each other over an internal data bus; and
two transceivers which are either connected to the same external data bus or to two different external data buses and are connected to the two arithmetic units so that the two arithmetic units are either connected to the same external data bus or to the two different data buses.

Both the microprocessors and the transceivers of the data bus interface according to the example embodiment of the present invention are integrated on a common p.c. board. The microprocessors in the form of microcontrollers each have two data bus controllers to increase the communication capacity of the interface. One of the data bus controllers is used for external communication between the microcontrollers and microcontrollers in other data bus interfaces, and the other data bus controller is used for internal communication between the microcontrollers.

At least one external data bus is provided for external data communication. The at least one data bus is located outside the data bus interface. Each microcontroller is connected to the at least one external data bus via a shared or a separate transceiver. The microcontrollers of the data bus interface according to the present invention are connected to other data bus interfaces, i.e., to their microcontrollers, and are able to exchange information with them via at least one external data bus. The microcontrollers are each connected to the transceivers via one of their data bus controllers (first data bus controller).

It is possible for the two transceivers to be connected to the same external data bus. Specifically, the first data bus controller of each transceiver is connected to the same data bus. Due to the fact that each data bus controller is able to manage only a certain number of message objects, this embodiment of the present invention has the advantage that the data bus interface according to the present invention is able to manage many more message objects: exactly twice as many in the present case involving two microcontrollers.

Connecting the two transceivers to different external data buses is proposed as an alternative. In other words, the first data bus controller of the first microcontroller is connected to a first external data bus via the first transceiver, and the first data bus controller of the second microcontroller is connected to a second external data bus via the second transceiver. The different data buses are operable at the same transmission rate or at different transmission rates. It is further possible to transmit signals at different transmission rates or at the same transmission rate via the two data buses. According to this alternative embodiment, the data bus interface according to the present invention would be able to operate, for example, as a gateway. This enables the data bus interface to communicate via two data buses, making it possible to exchange information bidirectionally over the control unit or the data bus interface to both data buses.

An internal data bus which is provided within the data bus interface and connects the two microcontrollers via their second data bus controllers is used for internal communication. The microcontrollers are connectable directly to the internal data bus without a transceiver, since the distance to be bridged via the internal data bus is relatively short, and few disturbances (potential and/or level shifts) influence the signals transmitted over the internal data bus. In addition, a relatively small number of different signals is transmitted via the internal data bus, which means that mutual impairment of the signals may also be ruled out almost completely. On the whole, therefore, the internal data bus may operate in normal mode without a transceiver, due to its simple and clear topology and low signal traffic. Data may be easily and economically exchanged via the internal data bus without sacrificing speed, security and reliability. The internal data bus may be designed, for example, as a CAN data bus.

This yields a data bus interface that may be used flexibly and implemented at low cost for a wide range of applications. The data bus interface is configurable for almost any type of data bus interconnection of the two arithmetic units. Due to the flexible application possibilities of the data bus interface and as a result of the high number of applications associated with this, it may be assumed that the interface also has cost advantages over conventional interfaces even if not all the functions of the data bus interface according to the present invention are used, for example, if both microcontrollers are connected to the external data bus via the same transceiver, and the microcontroller not connected to the external data bus sends and receives data via the internal data bus and via the other microcontroller that is connected to the external data bus. In this case, the second transceiver would not be used.

Providing the internal data bus with two lines which are connected to the two arithmetic units without transceivers is proposed according to an advantageous embodiment of the present invention. Specifically, the two lines are connected directly to one of the data bus controllers (the second data bus controller) of the two arithmetic units.

Connecting the lines of the internal data bus to the two arithmetic units via open collector outputs is proposed according to a preferred embodiment of the present invention. In other words, the second data bus controller of the two microcontrollers of the data bus interface has open collector connections to which the internal data bus is connected. Although asymmetry may occur in an open collector circuit in such a way that a signal switches to "low" (LO) relatively quickly when a transistor in the open collector circuit switches to ground, the signal rises, only slowly as a result of parasitic capacitances in the circuit, i.e., it switches to "high" (HI). However, the resulting signal asymmetry may be tolerated internally.

Connecting the two arithmetic units to the transceivers via push-pull terminals is proposed as an alternative. The first data bus controller of the two microcontrollers is connected to the external data bus via the push-pull terminals and one transceiver, since a push-pull circuit has less asymmetry than does an open collector circuit, so that the signal transmission between the microcontrollers and the external data bus may take place according to ISO (International Organization for Standardization) and CARB (California Air Resources Board) requirements (with only relatively little asymmetry).

Connecting a first terminal of the two arithmetic units to a first terminal of one of the two transceivers via an AND gate is further proposed. In this embodiment, therefore, the transmit terminals (TxD1) of the first data bus controller of the two microcontrollers are connected to the AND gate. The output of the AND gate is supplied to a first terminal of the shared transceiver. The advantage is that both microcontrollers are connectable to the external data bus via the same transceiver. Due to the AND gating of the transmit signals of the two microcontrollers, a dominant level is output to the external data bus via the shared transceiver whenever the first microcontroller, the second microcontroller or both microcontrollers output a level. A dominant level is not output to the external data bus only if both microcontrollers are inactive. The second transceiver of the data bus interface, which is not being used in this case, may then be used for other purposes. For example, it is possible to apply the signals transmitted via the internal data bus to an external data bus via the unused transceiver during a testing and calibration phase so that they may be monitored and analyzed.

A second terminal of the two arithmetic units is preferably connected directly to a second terminal of the first transceiver. In other words, the receive terminals (RxD1) of the first data bus controller of the two microcontrollers is connected directly to the second terminal of the shared transceiver. Signals received by the transceiver are thus forwarded to both microcontrollers.

Providing a first jumper element between the first connection of the first arithmetic unit and the first terminal of the first transceiver, parallel to the AND gate, is further proposed. The AND gate may be bypassed, and therefore deactivated, by opening and closing the jumper element. This enables the transmit terminal of the first data bus controller of the second microcontroller, and therefore the entire transmission path, to be decoupled from the AND gate, i.e., the first transceiver. Only the signals of the first microcontroller continue to be transmitted to the external data bus via the first transceiver. When the first jumper element is closed, the AND gate is preferably not supplied. Of course, any other switching element may be used instead of the first jumper element, and/or the latter may be inserted at any other point in the data bus interface circuit as long as this enables the same effect to be achieved (isolating the second arithmetic unit from the first transceiver).

The second terminal of the second arithmetic unit is advantageously connected via a second jumper element to a connecting line between the second terminal of the first arithmetic unit and the second terminal of the first transceiver. This jumper element enables the receiving path to the second microcontroller to be interrupted and thus the receive connection of the first data bus controller of the second microcontroller to be decoupled from the first transceiver, i.e., the external data bus. The second microcontroller may now access the external data bus either via the internal data bus and the first microcontroller or via the second transceiver. The second microcontroller is completely decoupled from the first transceiver by closing the first jumper element and opening the second jumper element. The position of the jumper elements is configured before actual series use of the data bus interface. Instead of the second jumper element, any other equivalent switching element may also be used at any other point in the circuit.

Connecting the internal data bus via a switching element to one of the two transceivers is further proposed, it being possible to establish and interrupt a connection between the internal data bus and the second transceiver via the switching element. The switching unit is preferably designed as a third jumper element provided between the two lines of the internal data bus. The third jumper element may be used to route the internal data bus to the external data bus, for example during a calibration phase.

Finally, the operation of the internal data bus according to the Controller Area Network (CAN) standard is proposed. Operating at least one of the external data buses according to the Controller Area Network (CAN) standard is likewise proposed. If more than one external data bus is provided, both external data buses are preferably operated according to the same standard, for example according to the CAN standard, albeit at different data rates if necessary. Using the same standards for transmitting data via the data buses improves compatibility so that, for example, signals may be supplied from the internal data bus to the external data bus without much additional complexity.

An object of the present invention is further achieved on the basis of the control unit of the type mentioned above by providing the control unit with a data bus interface according to the present invention.

BRIEF DESCRIPTION OF THE DRAWINGS

Additional features, possible applications and advantages of the present invention are explained in the following description of exemplary embodiments, which are illustrated in the figures. All features described or illustrated form the subject of the present invention, either alone or in combination, regardless of how they are combined or referenced.

DESCRIPTION OF EXAMPLE EMBODIMENTS

Figure 1:
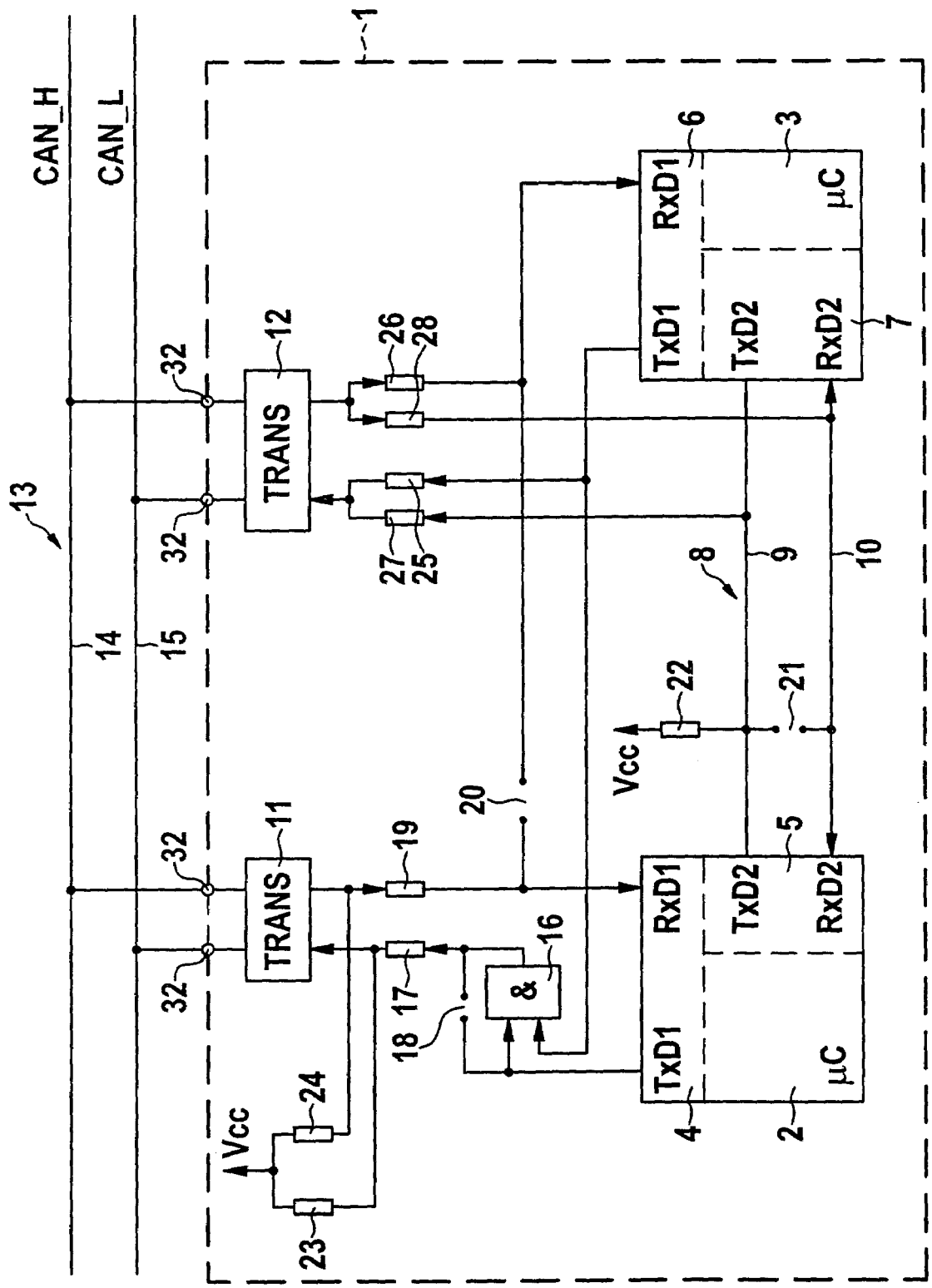
FIG. 1 shows a first preferred embodiment of a control unit according to the present invention.

In FIG. 1, reference numeral 1 designates a control unit according to the present invention in its entirety. Control unit 1 includes a first arithmetic unit 2, which is designed as a microprocessor, and a second arithmetic unit 3, which is also designed as a microprocessor. Computer programs are run on arithmetic units 2, 3, enabling arithmetic units 2, 3 to carry out certain control and/or regulating functions.

A preferred area of application of control unit 1 is, for example, automotive engineering. First arithmetic unit 2 may be used, for example, to control and/or regulate an internal combustion engine, and second arithmetic unit 3 may be used to control and/or regulate a transmission.

Each of the two arithmetic units 2, 3 has two separate data bus controllers 4, 5 and 6, 7, respectively. First data bus controller 4 of first arithmetic unit 2 includes a first transmit terminal TxD1 and a first receive terminal RxD1. Second data bus controller 5 of first arithmetic unit 2 includes a second transmit terminal TxD2 and a second receive terminal RxD2. The same applies to first and second data bus controllers 6, 7 of second arithmetic unit 3. Terminals TxD1 of first data bus controllers 4, 6 of the two arithmetic units 2, 3 are designed as push-pull terminals. The two terminals TxD2 and RxD2 of second data bus controllers 5, 7 of the two arithmetic units 2, 3 are designed as open collector terminals.

The two arithmetic units 2, 3 communicate with each other via an internal data bus 8. Internal data bus 8 includes a first line 9, which connects transmit terminals TxD2 of second data bus controllers 5, 7 of the two arithmetic units 2, 3, as well as a second line 10, which connects receive terminals RxD2 of second data bus controllers 5, 7 of the two arithmetic units 2, 3. Due to the relatively short length of lines 9, 10, the low transmission rate between the two arithmetic units 2, 3 via internal data bus 8 and the near absence of disturbing influences (causing potential and/or level shifts), it is not necessary to use separate transceivers via which arithmetic units 2, 3 are connectable to lines 9, 10. Data is transmitted via internal data bus 8 according to a specific transmission protocol, for example the CAN (Controller Area Network) standard.

Control unit 1 also includes two transceivers 11, 12. Transceivers 11, 12 are connected to an external data bus 13, which is designed as a CAN bus having two lines 14, 15 (CAN_H, CAN_L). Transceivers 11, 12 are used to condition signals which are to be received by external data bus 13 or transmitted thereby.

According to a first embodiment, the two arithmetic units 2, 3 are connected to first transceiver 11 so that the two arithmetic units 2, 3 are connected to external data bus 13 via this first transceiver 11. Specifically, first transmit terminals TxD1 of first data bus controllers 4, 6 of the two arithmetic units 2, 3 are connected to the inputs of an AND gate 16. The output of AND gate 16 is connected to a first terminal of transceiver 11 via a first resistor 17. Parallel to AND gate 16, a jumper element 18 is provided between first transmit terminal TxD1 of first data bus controller 4 of first arithmetic unit 2 and the output of AND gate 16.

The second terminal of transceiver 11 is connected via a second resistor 19 to first receive terminal RxD1 of first data bus controller 4 of first arithmetic unit 2, and via a second jumper element 20 to first receive terminal RxD1 of first data bus controller 6 of second arithmetic unit 3. A dominant signal level is applied to the output of AND gate 16 if first arithmetic unit 2 or second arithmetic unit 3 transmits a dominant signal level, or if both arithmetic units 2, 3 transmit a dominant signal level. A dominant signal level is not present only when both arithmetic units 2, 3 are inactive. Thus, the signals to be transmitted by the two arithmetic units 2, 3 are forwarded to external data bus 13 via transceiver 11. Signals received by data bus 13 are supplied to the two arithmetic units 2, 3 via transceiver 11.

To implement this function, first jumper element 18 must be open and second jumper element 20 closed. Since each data bus controller 4 through 7 is able to manage only a limited number of message objects, the described first embodiment of control unit 1 according to the present invention has the advantage that control unit 1 may manage twice the number of message objects on external data bus 13, since the two data bus controllers 4, 6 are each able to manage the usual number of messages on the external data bus 13, i.e., together twice as many messages.

According to a second embodiment, it is possible for information to be transmitted via external data bus 13 to be first transmitted by second arithmetic unit 3 to first arithmetic unit 2 via internal data bus 8 and then forwarded to external data bus 13 via first transceiver 11. In this case, arithmetic unit 12 would function as a kind of forwarding station. To implement this function, a third jumper element 21 provided between the two lines 9, 10 of internal data bus 8 must be closed. Both lines 9, 10 of internal data bus 8 are connected via a pull-up resistor 22 to a supply voltage Vcc, which may be, for example, 1.8 volts, 3.3 volts or 5.0 volts. In this manner, signals on lines 9, 10 which are connected to open collector terminals TxD2 and RxD2 may be raised to a "high" level (1.8 volts; 3.3 volts; 5.0 volts; or another voltage). The two pull-up resistors 23 and 24, which are used to connect the arithmetic unit-side terminals of transceiver 11 to supply voltage Vcc, also serve this purpose.

For certain applications of control unit 1, it is expedient to connect second arithmetic unit 3 to external data bus 13 via a separate transceiver according to a third embodiment. For this purpose, terminals TxD1 and RxD1 of first data bus controller 6 of second arithmetic unit 3 are connected to the arithmetic unit-side terminals of second transceiver 12 via a third resistor 25 and a fourth resistor 26, which operate as jumpers. To enable the two arithmetic units 2, 3 to access external data bus 13 via separate transceivers 11, 12 in the given circuit, first jumper element 18 must be closed, AND gate 16 removed, and second jumper element 20 opened.

During the development and/or calibration phase of control unit 1, it may be expedient to connect internal data bus 8 to external data bus 13. For this purpose, according to a fourth embodiment the two lines 9, 10 of internal data bus 8 are connected to the arithmetic unit-side connection of second transceiver 12 via a fifth resistor 27 and a sixth resistor 28. This enables the transmission of information via internal data bus 8 to be monitored and analyzed from the outside of control unit 1 via external data bus 13. To implement this function, third jumper element 21 must be opened.

One part of control unit 1 according to the present invention is a data bus interface which is formed by the two transceivers 11, 12 and the parts of arithmetic units 2, 3 that are responsible for communicating with internal data bus 8 and external data bus 13. In addition to these communication parts, which form the data bus interface along with the necessary interconnection, arithmetic units 2, 3 also have parts for performing its intended control and/or regulating function. These parts execute, for example, the control program on arithmetic units 2, 3.

Figure 2:
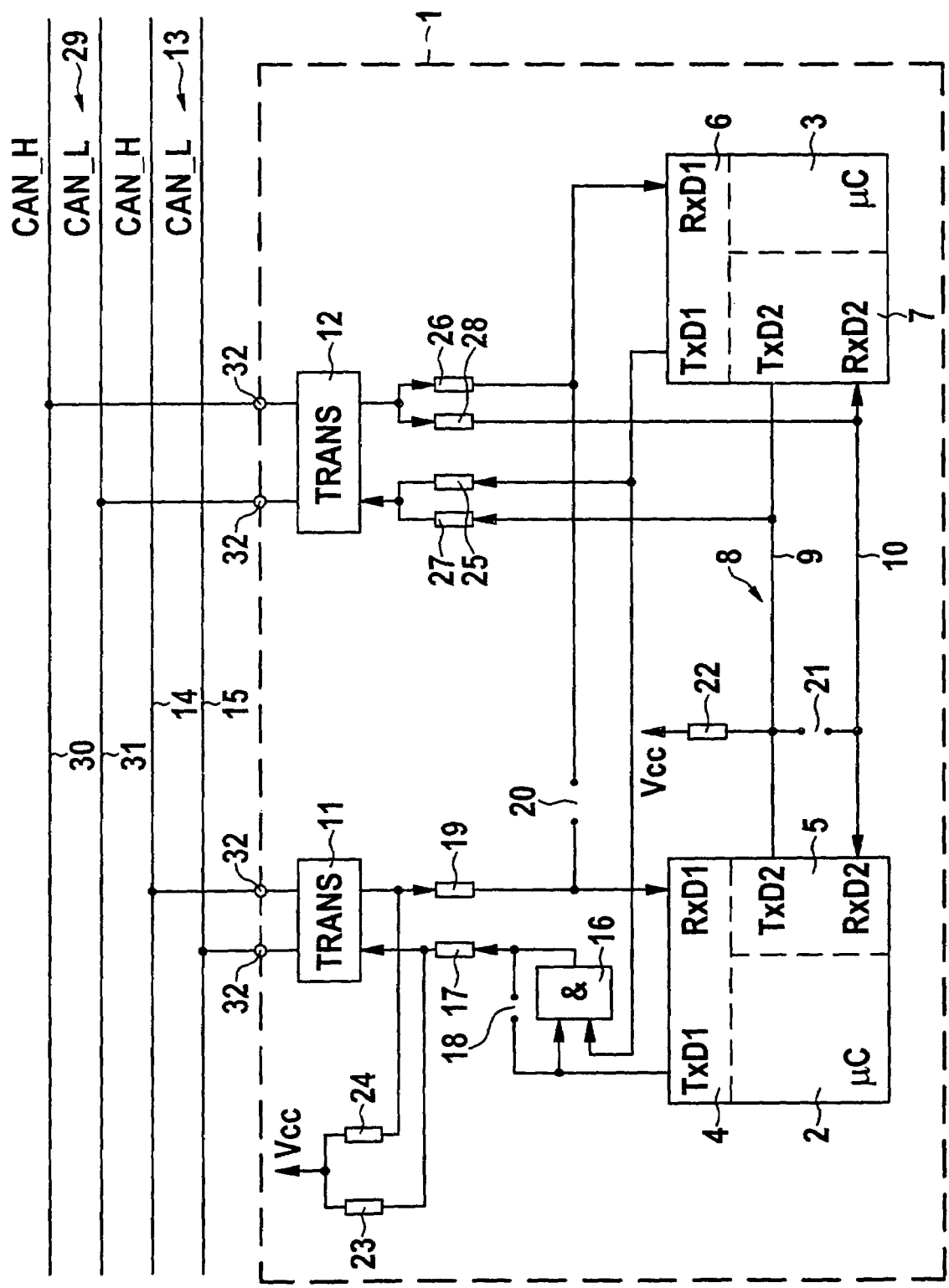
FIG. 2 shows a second preferred embodiment of a control unit according to the present invention.

FIG. 2 shows a second preferred embodiment of a control unit 1 according to the present invention. The actual circuit of the data bus interface is identical to the circuit shown in FIG. 1. In contrast to the embodiment in FIG. 1, control unit 1 in FIG. 2 is connected to two different external data buses. Thus, first transceiver 11 is connected to a first data bus 13 having lines 14, 15 (CAN_H, CAN_L). Second transceiver 12 is connected to a second external data bus 29 having lines 30, 31 (CAN_H, CAN_L). In the illustrated exemplary embodiment, information is transmitted via the two external data buses 13, 29 according to the same transmission protocol, namely the CAN standard. The information is transmittable via the two external data buses 13, 29 at the same data transmission rate or at different data transmission rates. All other designs described above with regard to the exemplary embodiment according to FIG. 1 may also be implemented in the exemplary embodiment illustrated in FIG. 2. In the case of the illustrated exemplary embodiment, first arithmetic unit 2 transmits and receives data via first external data bus 13, and second arithmetic unit 3 transmits and receives data via second external data bus 29. Likewise, the transmission of information between the two arithmetic units 2, 3 via internal data bus 8 may be outwardly supplied via second transceiver 12 to second external data bus 29 and monitored thereby.

The multifunctional data bus interface according to the present invention may be used to perform a plurality of tasks and functionalities in control unit 1:

The electronic circuit for internal data bus 8 enables the two arithmetic units 2, 3 (microcontrollers) in control unit 1 to communicate via internal data bus 8 at transmission rates of up to 500 kbaud. Data bus 8 is also referred to as an in-house CAN bus or an internal control unit CAN bus. If desired, and if no connection is set up to control unit terminals 32 of control unit 1, the exchange of data between the two arithmetic units 2, 3 is entirely discrete and is not detectable outside control unit 1. If a suitable component configuration is used, internal data bus 8 is fully capable of being monitored using external commercially available data bus diagnostic tools. This enables software developers to efficiently verify their software, in particular to exchange information on internal data bus 8. Internal data bus 8 is connectable to a data bus 13 or 29 outside the control unit via control unit terminals 32. This eliminates the need to provide additional adapter p.c. boards for calibration purposes. Internal data bus 8 is connected to an external data bus 13, 29, e.g., for the purpose of monitoring and communicating with other microprocessors in other control units.

Via the electronic circuit for the data bus interface, and using a suitable component configuration, each of the two arithmetic units 2, 3 in control unit 1 is connectable to a shared data bus 13 outside the control unit or to separate data buses 13, 29, having different transmission rates if necessary. The number of components and the amount of space required on the p.c. board is minimal, because transceivers 11, 12 needed to connect to external data bus 13, 29 are used flexibly. In particular, the circuit supports the following special features:

If the number of message objects to be managed is small enough, only one arithmetic unit 2 or 3 may be connected to data bus 13 outside the control unit. Information to be transmitted or received for the other arithmetic unit 3 via external data bus 13 is exchanged via internal data bus 8. The advantage is minimum component complexity.

Second arithmetic unit 3 is connectable to the data bus path of first arithmetic unit 2. For this purpose, first jumper element 18 is open and second jumper element 20 is closed. An advantage of this is that twice the number of message objects may be managed within the overall system. Only one transceiver 11 is needed to connect both arithmetic units 2, 3 to external data bus 13. The configuration further enables the microprocessor kernels of both arithmetic units 2, 3 to be programmed serially via external data bus 13, using suitable software.

Second arithmetic unit 3 is connectable to a separate external data bus 29 via second transceiver 12. To do this, monitoring may not be carried out for internal data bus 8, and transceiver 12 must be available for connecting second arithmetic unit 3 to external data bus 29. This enables the overall system to communicate via two data buses 13, 29, which may have different transmission rates. Information may be exchanged bidirectionally over control unit 1 to both data buses 13, 29. This functionality is also known as a gateway functionality. The processor kernels of both arithmetic units 2, 3 are now programmable simultaneously via data buses 13, 29, using suitable software.

The described electronic circuit according to the present invention enables a data bus interface supporting nearly all types of data bus interconnections of the two arithmetic units 2, 3 to be configured in a control unit 1 having two arithmetic units 2, 3 which each include two data bus controllers 4, 5 and 6, 7, respectively. It is also possible to implement a plurality of functions using a relatively simple circuit:

Communication of two arithmetic units 2, 3 via a data bus connection 8 in the control unit at a high transmission rate. The data exchange is not detectable outside control unit 1.

Monitoring and control of the information exchange via internal data bus 8 during the development and/or calibration phase.

Connection of internal data bus 8 to an external data bus 13 or 29.

Two arithmetic units 2, 3 are connected to a shared external data bus 13, using only one transceiver 11. This enables twice the number of message objects to be managed within the overall system.

The microprocessor kernels of the two arithmetic units 2, 3 are programmable serially via external data bus 13 or in parallel via the two data buses 13, 29.

CAN gateway functionality.

Control unit 1 according to the present invention was described for two arithmetic units 2, 3 and for two transceivers 11, 12. It is also possible, of course, to implement the control unit according to the present invention so that it has more than two arithmetic units and more than two transceivers.

What is claimed is:

1. A data bus interface for a control unit of a motor vehicle control unit, the interface comprising:
    two arithmetic units which directly communicate with each other via an internal data bus without the use of an intervening memory; and
    two transceivers which are configured to be selectively both connectable to a same external data bus and each connectable individually to a different one of two different external data buses, the two transceivers being interconnected with the two arithmetic units in such a way that the two arithmetic units are configured to be selectively both connectable to a same one of the two transceivers and each connectable to a different one of the two transceivers;
    wherein a receiving terminal of a second of the two arithmetic units is connected via a jumper element to a connecting line between a receiving terminal of a first of the two arithmetic units and a terminal of a first of the two transceivers, and
    wherein if the two arithmetic units are connected to the same external data bus, the jumper element is closed, and if the two arithmetic units are connected to the two different external data buses, the jumper element is open.

2. The data bus interface as recited in claim 1, wherein the two arithmetic units are microprocessors.

3. (The data bus interface as recited in claim 1, wherein the internal data bus includes two lines which are connected to the two arithmetic units without transceivers external to the two arithmetic units.

4. The data bus interface as recited in claim 3, wherein the two lines are connected to the two arithmetic units via open collector terminals.

5. The data bus interface as recited in claim 1, wherein the two arithmetic units are connected to the transceivers via push-pull terminals.

6. The data bus interface as recited in claim 1, wherein a first terminal of the two arithmetic units is connected to a first terminal of one of the two transceivers via an AND gate.

7. The data bus interface as recited in claim 6, wherein a second terminal of the two arithmetic units is connected to a second terminal of the one of the two transceivers.

8. The data bus interface as recited in claim 6, further comprising:
an additional jumper element parallel to the AND gate, the additional jumper element being provided between the first terminal of the first arithmetic unit and the first terminal of the one of the two transceivers.

9. The data bus interface as recited in claim 1, wherein the internal data bus is connected to one of the two transceivers, a connection between the internal data bus and the one transceiver being established and interrupted via a switching element.

10. The data bus interface as recited in claim 9, wherein the switching element is a third jumper element provided between two lines of the internal data bus.

11. The data bus interface as recited in claim 1, wherein the internal data bus operates according to a Controller Area Network (CAN) standard.

12. The data bus interface as recited in claim 1, wherein at least one of the external data buses operates according to a Controller Area Network (CAN) standard.

13. The data bus interface of claim 1, further comprising:
an interconnection element configured to selectively connect the internal data bus to one of the two transceivers to enable information on the internal data bus to appear at an output of one of the two transceivers.

14. The data bus interface as recited in claim 1, wherein the two arithmetic units are microprocessors, wherein the internal data bus includes two lines which are connected to the two arithmetic units without transceivers external to the two arithmetic units, wherein the two lines are connected to the two arithmetic units via open collector terminals, wherein the two arithmetic units are connected to the transceivers via push-pull terminals.

15. The data bus interface as recited in claim 14, wherein a first terminal of the two arithmetic units is connected to a first terminal of one of the two transceivers via an AND gate, and wherein a second terminal of the two arithmetic units is connected to a second terminal of the one of the two transceivers.

16. The data bus interface as recited in claim 14, further comprising:
an additional jumper element parallel to the AND gate, the additional jumper element being provided between the first terminal of the first arithmetic unit and the first terminal of the one of the two transceivers;
wherein a first terminal of the two arithmetic units is connected to a first terminal of one of the two transceivers via an AND gate.

17. The data bus interface as recited in claim 14, wherein the internal data bus is connected to one of the two transceivers, a connection between the internal data bus and the one transceiver being established and interrupted via a switching element, wherein the switching element is a third jumper element provided between two lines of the internal data bus, wherein the internal data bus operates according to a Controller Area Network (CAN) standard, and wherein at least one of the external data buses operates according to a Controller Area Network (CAN) standard.

18. A data bus interface comprising:
a first arithmetic unit connected to a first end of at least one data transmission line, and a second arithmetic connected to a second end of the at least one data transmission line, wherein the first and second arithmetic units are configured to communicate data directly to each other via the at least one data transmission line; and
a first transceiver and a second transceiver interconnected with the first and second arithmetic units via interconnection elements, wherein at least one of the interconnection elements has a plurality of states which are selectable to selectively enable connection of both the first and second arithmetic units to a same one of the first and second transceivers and connection of each of the first and second arithmetic units to a different one of the first and second transceivers.

19. The data bus interface of claim 18, wherein the at least one interconnection element includes at least one jumper element having a selectable open and a closed state.

20. The data bus interface of claim 19, wherein the at least one jumper element includes a first jumper element connected to a transmit terminal of the first arithmetic unit.

21. The data bus interface of claim 20, wherein the at least one jumper element further includes a second jumper element connected to a receive terminals of both the first and second arithmetic units.

22. The data bus interface of claim 21, wherein if both the first and second arithmetic units are connected to the same external data bus, the first jumper element is open and the second jumper element is closed.

23. The data bus interface of claim 21, wherein if each of the first and second arithmetic units are connected to different external data buses, the first jumper element is closed and the second jumper element is opened.

24. The data bus interface of claim 18, further comprising an AND gate connected to a transmit terminal of both the first and second arithmetic units.

25. The data bus interface of claim 18, further comprising:
a second interconnection element configured to selectively connect the internal data bus to one of the two transceivers to enable information on the internal data bus to appear at an output of one of the two transceivers.

26. A data bus interface comprising:
two arithmetic units which directly communicate with each other via an internal data bus without the use of an intervening memory; and
two transceivers which are interconnected with the two arithmetic units in such a way that the two arithmetic units are selectably connectable to a same one of the two transceivers and connectable to different ones of the two transceivers, the selectable connectivity depending on a selection state of at least one element interconnecting the two transceivers and two arithmetic units.

27. The data bus interface of claim 26, further comprising:
a second interconnection element configured to selectively connect the internal data bus to one of the two transceivers to enable information on the internal data bus to appear at an output of one of the two transceivers.

* * * * *